United States Patent [19]

Akriche et al.

[11] 3,943,348

[45] Mar. 9, 1976

[54] APPARATUS FOR MONITORING THE OPERATION OF A DATA PROCESSING COMMUNICATION SYSTEM

[75] Inventors: Jean Akriche, Margency; André Molitor, La Varenne-St-Hilaire, both of France

[73] Assignee: Honeywell Information Systems Inc., Waltham, Mass.

[22] Filed: May 10, 1974

[21] Appl. No.: 468,964

[30] Foreign Application Priority Data
May 14, 1973 France .............................. 73.17357

[52] U.S. Cl. ................. 235/153 AK; 340/146.1 BE
[51] Int. Cl.² ........................................ G06F 11/00
[58] Field of Search ............... 235/153 AE, 153 AK; 340/146.1 BE, 172.5

[56] References Cited
UNITED STATES PATENTS

| | | | |
|---|---|---|---|
| 3,409,877 | 11/1968 | Alterman et al. ................. | 340/172.5 |
| 3,654,603 | 4/1972 | Gunning et al. ............ | 340/146.1 BE |
| 3,692,989 | 9/1972 | Kandiew ....................... | 235/153 AK |
| 3,790,769 | 2/1974 | Ziegler ........................ | 235/153 AK |
| 3,794,973 | 2/1974 | Huber et al. ................. | 235/153 AC |
| 3,818,199 | 6/1974 | Grossmann et al. ......... | 235/153 AK |
| 3,838,261 | 9/1974 | Rice et al. .................... | 235/153 AC |
| 3,842,405 | 10/1974 | Key et al. ......................... | 340/172.5 |

*Primary Examiner*—Charles E. Atkinson
*Attorney, Agent, or Firm*—Faith F. Driscoll; Ronald T. Reiling

[57] ABSTRACT

A data processing system includes a data processing unit and a number of communication units for coupling a corresponding number of terminal devices for transmission and reception of signals over a number of communication lines. Apparatus checks the operation of the communication units and includes logic circuits which couple to the receiver and transmitter circuits of each unit, circuits for transmitting checking signals to the receiver circuits of the unit and circuits for receiving signals transmitted by the transmitter circuits of the units. Additionally, each of the logic circuits couples to the data processing unit and are arranged to be enabled in succession by the data processing unit for transmission and reception of the checking signals and response signals respectively while still allowing the units not being checked to operate normally.

6 Claims, 2 Drawing Figures

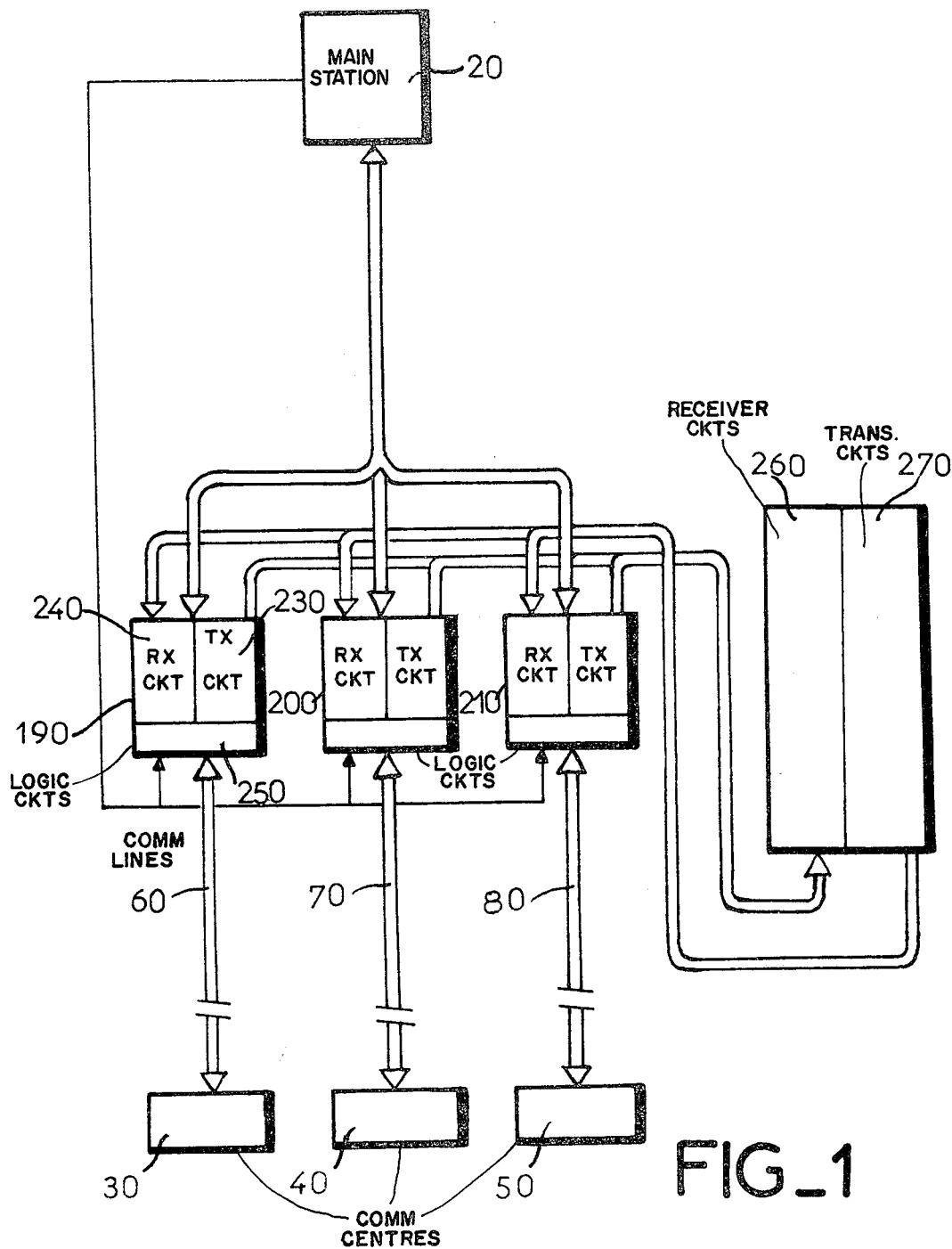
FIG_1

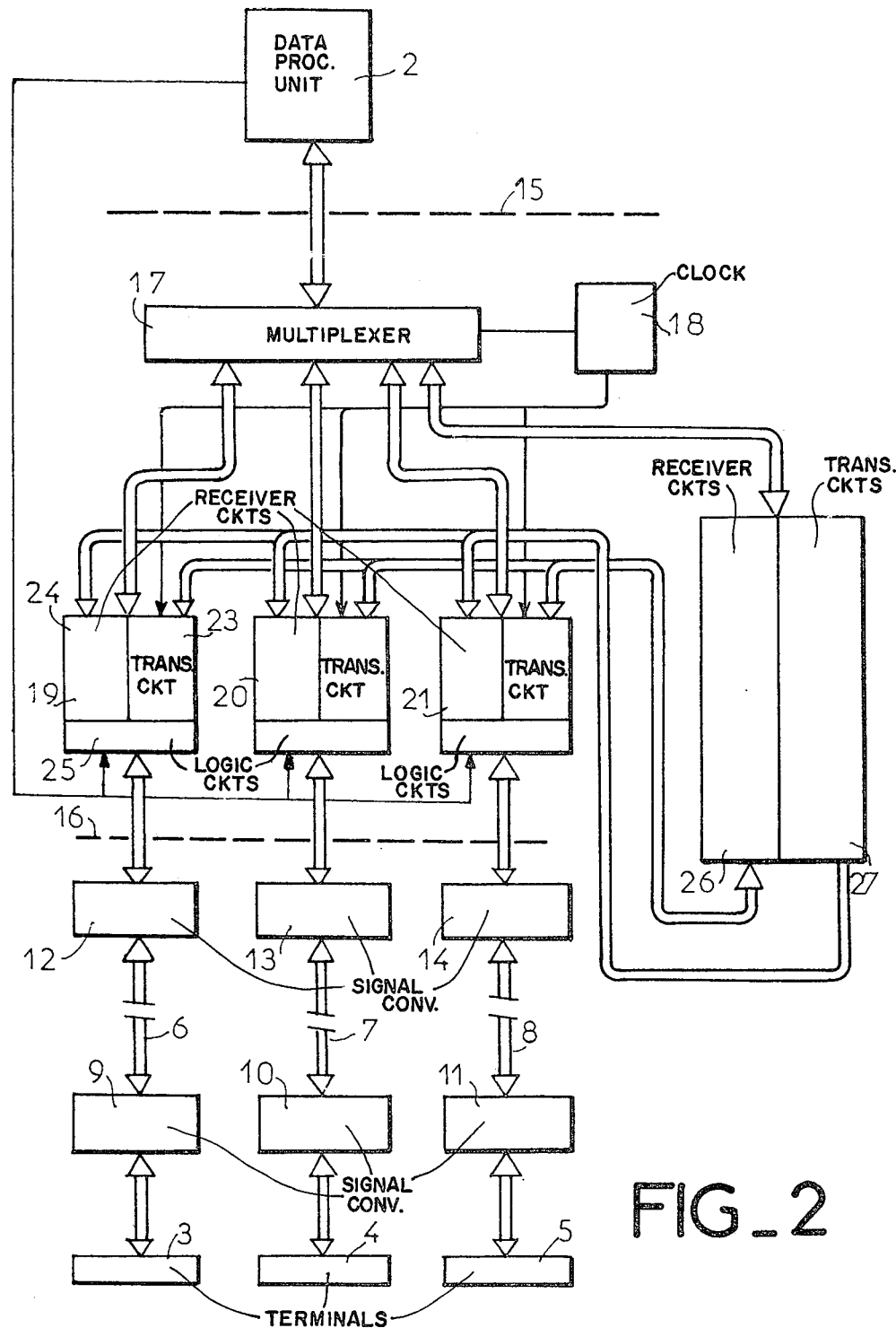
FIG_2

APPARATUS FOR MONITORING THE OPERATION OF A DATA PROCESSING COMMUNICATION SYSTEM

BACKGROUND OF THE INVENTION

1. Field of Use

The present invention relates to an arrangement for maintaining means of communication between a main station and various communications centres, the means in question being capable of conveying messages at different speeds using transmission methods which will be explained below. This arrangement, which allows considerable savings in time to be made, is particularly suited to the data-processing field.

2. Prior Art

In the more and more widely used technique of remote processing, information exchanged between the central unit and the terminal systems is exchanged over very long distances at very high speed. Remote processing is used at the present time by banks for operations carried out between a head office and its branches, by transportation companies to reserve seats, and in telegraphic dealings between a central unit and remote terminals.

The items of information, which are transmitted in binary code or bits, grouped into messages are conveyed at different speeds and by different methods. The "asynchronous" method of communication may be used in which each character in a message is made up from a number of bits plus a so-called "start" signal which precedes the character and a so-called "stop" signal which follows it. The "synchronous" method of communication may also be used. With this method one or more synchronizing characters are placed at the beginning of the message, on the one hand to synchronize the clock used in sampling the bits in the message, and on the other hand to identify at the receiving apparatus, the beginning of the message following the synchronizing characters. Synchronizing characters may also be transmitted so as to keep a transmitter and a receiver synchronized.

In the majority of systems for transmitting information between a processing unit and distant terminals, communications means are provided to adapt the characteristics of the interfaces associated with each line of communication to those of the interfaces associated with the processing unit. These means are arranged in series with each line and are generally known as communications adapters.

Upon reception, the adapters receive the bits from the lines at different speeds, and transmit them to the processing unit. Upon transmission, the bits intended for the various lines are directed by the processing unit to the adapters, which then transfer them to the appropriate lines. Each adapter may have a buffer register which may be capable of containing a number of characters.

Transmission systems become more complicated when the question is one of maintaining or checking the operation of the communication means and in particular the operation of the adapters. The maintenance system which allows the operation of the adapters to be checked in fact needs to contain circuits, the complexity of which is related to the method of operation used by the adapters which it has to check. These adapters are of differing types depending on whether communication is synchronous or asynchronous, the selected speed of communication, the number of bits per character in the message, and the length of the "stop" signal. Thus, if a user wishes to add a new type of terminal at the end of a line which communicates with the processing unit, it is first of all necessary for the existing adapter on this line to be replaced by another adapter suitable to the new type of communication between the terminal and the processing unit. More importantly, it is necessary to modify the maintenance system to allow this new adapter to be checked. Added to this is the necessity for an adapter to be disconnected physically from its associated line when its operation is to be checked. This means an unfortunate loss of time to the user and may also require the presence of an engineer.

It is an object of the present invention to substantially reduce or overcome the above drawbacks and in particular to make it possible to provide a choice between various methods of communication without the necessity for altering the maintenance arrangement or physically disconnecting the communications line associated therewith when it is desired to check same.

It is another object to provide rapid maintenance at reduced cost.

It is still a further object to provide an arrangement for maintaining means of communications between a main station and various communications centres including transmission and reception circuits and for controlling a communication line between the main station and a terminal.

SUMMARY OF THE INVENTION

The foregoing objects are achieved in a preferred embodiment of the present invention which include a maintenance arrangement which comprises:

a. a circuit for transmitting checking signals which is connected to the receiver circuits of the communications means;

b. a circuit for receiving signals transmitted in response to the checking signals which is connected to the transmission circuits of the communications means; and c. a logic circuit for each of the communications means which enables the communications means in question to be connected by electrical means to its corresponding line. Each connection circuit is controlled electrically by the main station in such a way that all the communications means may be disconnected in succession so that they may be checked.

The invention will now be further described, by way of example, with reference to the accompanying drawings.

BRIEF DESCRIPTION OF THE DRAWINGS

FIG. 1 shows an arrangement for maintaining means of communication between a main station and various communications centres.

FIG. 2 shows an application of the arrangement of FIG. 1 when the main station is a data-processing unit and the various centres are terminal systems.

DESCRIPTION OF THE PREFERRED EMBODIMENT

The arrangement for maintaining communications means shown in FIG. 1 is used to check the means of communication between a main station 20 and outlying centres 30, 40, 50. Communication is via lines 60, 70, 80 and these may be telephone or telegraph lines. The communications units marked 190, 200 and 210 allow the lines to be connected to the main station. For ease of representation it has been assumed that only three lines and three centres are connected to the main station but this number could obviously vary and in particular could be increased. Each of the communications units 190, 200 and 210 has transmission and reception circuits. It will be assumed that the transmission circuit associated with a communications unit enables a centre to receive information from the main station 20 and the reception circuit enables a centre to transmit information to the main station 20.

The arrangement for maintaining the communications units comprises circuit 270 for transmitting checking signals which is connected to the reception circuits 240 associated with each of the communications units, and a circuit 260 for receiving signals transmitted in response to the checking signals and is connected to the transmission circuits 230 associated with each of the communications units. The maintenance arrangement further includes logic circuits 250 for connecting each of communications units to the lines to which they connect. Each of the logic circuits 250 enable the communications units and the lines corresponding to them to be connected and disconnected by electrical means, without the need for an operator, by means of signals from the main station 20.

When it is necessary to check the operation of communications unit 190, when the other units 200 and 210 are operating, the logic circuits 250 which connect communication unit 190 to line 60 are inhibited by signals from the main station 20. These signals may be logic or binary 0 signals which are applied to the inputs of AND gates (not shown) which connect the unit to line 60. Once this logic disconnection has been brought about, checking of communications unit 190 begins. The transmission circuit 270 of the maintenance arrangement transmits checking signals to the receiver circuit 240 of its communications units and the checking signals cause the unit to transmit via its transmission circuit 230 response signals to the receiver circuit 260 of the maintenance system. The receiver circuit 260 includes means for analyzing and recording the response signals. In effect, the signals from the adapter unit generated in response to the checking signals either are indicative of the fact that the communications unit is operating satisfactorily or has a malfunction or failure in one of its circuits.

The maintenance system controlled by the main station 20 enables all the units by which the station communicates with the various centres to be checked in succession.

An embodiment of the maintenance arrangement will now be described with reference to FIG. 2 where communication is established between a data-processing unit 2 and outlying terminals 3, 4, 5, which may be, for example, teleprinters or devices for transmitting data signals to the processing unit 2. The communications take place via transmission lines 6, 7, and 8, which may be telephone or telegraph lines. Signal converters 9, 10, 11 and 12, 13, 14 are connected at either end of the lines 6, 7, and 8. The converters may be of the telegraphic type wherein data is transmitted over telegraph lines or may be modulator/demodulators termed "MODEMS" for transmitting data over telephone lines. Such signal converters are well known to those skilled in the art. For example, reference may be made to U.S. Pat. No. 3,752,923 issued Aug. 14, 1973.

The communications units marked 19, 20 and 21 connect together the two interfaces 15 and 16 represented by broken lines. The interface 15 allows the communications units or adapters to be connected to the processing unit 2 while the interface 16 allows the adapters to be connected to the telephone communications lines via modems. This interface 16 conforms to well known international communications standards.

For ease of explanation, it is assumed that only three communications lines and three terminals are connected to the processing unit 2 but this number could obviously vary and in particular could be increased. Also, in the description which follows, it will be assumed that communications between the processing unit 2 and the terminals are of a semi-duplex or half-duplex nature. That is, the processing unit 2 can transmit data to a terminal but during that transmission, the receiving terminal cannot transmit to the processing unit 2. Only when the processing unit 2 signifies that it has finished its transmission by means of an end of block or end of message character will it be then possible for the terminal to transmit to the processing unit 2 upon having recognized or detected this character. This two-way exchange is represented in FIG. 2 by single arrows pointing in two directions. Also shown is a multiplexer 17 which is in two-way communication with the processing unit 2 through the interface 15. In one direction, it transfers data received from the various communication lines via the adapters to the processing unit 2. In the opposite direction, it distributes data transmitted by the processing unit 2 to those communication lines which are designated by appropriate address codes. A clock 18 applies timing signals to the adapters which are used chiefly for asynchronous communications.

Each of the adapters 19, 20 and 21 shown in the Figure may be of the synchronous type for synchronous communications, or they may be of the asynchronous type for asynchronous communications, but they may not handle both types of communications at the same time.

Finally, the communications system of FIG. 2 incorporates a maintenance arrangement which allows the operation of the adapters to be checked. The arrangement includes a receiver circuit 26, a transmitter circuit 27, and logic connecting circuits 25 controlled by the processing unit 2 which allow the adapters to be connected to their corresponding lines.

The adapters and the arrangement for their maintenance will now be examined in greater detail. Each adapter has a transmission circuit 23 and a reception circuit 24. The transmission circuit of an adapter allows a terminal to receive data from the processing unit 2 and the reception circuit allows data to be transmitted from a terminal to the processing unit 2. The transmission and reception circuits of the adapters are made up of components which are selected on the basis of the nature of the communications which are to take place. That is, in the case of synchronous and asynchronous communications, the selection of circuits is based upon the speed of communication, and the number of bits per character in the message to be transmitted, and in the case of asynchronous communications, upon the number of "stop" signals. The transmission circuit 23 of each adapter is connected to a receiver circuit 26 and in the maintenance system and conversely the receiver circuit 24 of each adapter is connected to a transmission circuit 27 in the maintenance system.

The logic circuits 25 for connecting the adapters to the communications lines form part of the maintenance arrangement and they allow an adapter to be disconnected from the line associated therewith by means of signals from the processing unit 2 without the necessity for physical disconnection. While the system shown in the Figure is operating, the adapters are disconnected in succession but not simultaneously, when their operational state is to be checked.

The operation of the arrangement of which the layout has just been described will now be explained in greater detail. It is assumed that the operation of adapter 19 is to be checked while adapters 20 and 21 operate to maintain communications between the processing unit 2 and terminals 4 and 5. For the purposes of this check, the logic circuits 25 for connecting the adapter to transmission line 16 are inhibited by signals applied from the processing unit 2. These signals may, for example, be logic binary 0 signals which are applied to one of the inputs of output AND gates (not shown) and which provide a link to modem 12.

Once this logic disconnection has been carried out, checking of the adapter begins. Transmission circuit 27 of the maintenance arrangement transmits checking signals to the receiver circuit 24 of the adapter and this in turn causes the transmitter circuit 23 in response to the checking signals to transmit response signals to the receiver circuit 26 of the maintenance arrangement. This receiver circuit 26 incorporates means for analyzing the response signals, as well as recording means. The signals from the adapter received in response to the checking signals are in fact indicative either of the fact that the adapter is operating satisfactorily or that a malfunction has occurred in one of its circuits.

It will then be within the capacity of those skilled in the art to draw up a checklist of malfunctions and thus to trace possible faults on the basis of the contents of the recording means, not shown, but which are included in the receiver circuits 26 of the maintenance system. The analyzing means may be so designed as to give an alarm signal in the event of major faults. The maintenance arrangement is controlled by the processing unit and its transmitter circuit includes programmable means. Since the adapters may be either of the synchronous or the asynchronous type and since they contain components which are selected on the basis of the rapidity with which messages are to be exchanged and of the number of bits per character in the message (and of the number of stop signals in the case of asynchronous communication), it is necessary for the transmission circuit of the maintenance arrangement to include members which can be programmed in response to these parameters. These members are registers, not shown, in the Figures and whose contents are altered, as dictated by the values of the aforementioned parameters.

The maintenance arrangement controlled by the processing unit 2, allows all the adapters to be checked in succession during which time the adapters with the exception of the one being checked operate simultaneously. It is possible by means of this arrangement to check asynchronous adapters capable of a speed of 2400 bauds, and synchronous communications adapters capable of speeds equal to or better than 2400 bauds. For further information regarding types of adapters, reference may be made to U.S. Pat. No. 3,500,466 which issued Mar. 10, 1970.

This arrangement for maintaining communications lines provides very considerable time-savings when checking line-adapters since it eliminates the need to have the adapter which is to be checked to be disconnected physically from its line. The arrangement requires only that the logic circuits at the output of the adapter to be disconnected by electrical means while the other adapters are allowed to continue operation. In this way it is possible for all the adapters to be checked in succession and repeatedly all the time that communications take place. Furthermore, the programmable members of the maintenance arrangement make it possible for different types of adapters to be checked without the need to alter the circuits of the maintenance system. This in addition to providing a saving in time also provides an appreciable reduction in cost.

It should be clear that in the system described, certain changes can be made to the circuits described without exceeding the scope of the present invention. It is also apparent that the maintenance arrangement described in the context of communications adapters could also be used for the maintenance of different types of communication means.

Having described the invention, what is claimed is:

1. An arrangement for maintaining communication apparatus coupled between a main station and a plurality of communication terminals by a plurality of communication lines, said communication apparatus including a plurality of communication means, each including a plurality of reception and transmission circuits and being operative to control transmission over a communication line coupled between said main station and one of said terminals, said arrangement comprising:
   a. circuit means for transmitting checking signals, said circuit being connected to each of said reception circuits of said communication means;
   b. circuit means connected to each of said transmission circuits of said communications means for receiving signals transmitted in response to said checking signals; and,
   c. a logic circuit means coupled to each of said reception and transmission circuits of each of the communication means for enabling said communication means to be operatively coupled to a corresponding one of said lines, each of said logic circuit means being connected to said main station and conditioned by said main station so as to enable all said communications means to be disconnected in succession for reception and transmission of said checking signals.

2. The arrangement of claim 1 wherein said circuit means for receiving said response signals includes means for recording and analyzing the said response signals.

3. A maintenance arrangement for maintaining communication apparatus coupled between a data processing unit and a plurality of terminals, a plurality of communications means, each including receiver circuits and transmitter circuits, each coupled to a line and operative to control signal communication over said line between said processing unit and a different one of said terminals, said maintenance arrangement comprising:
   a. circuit means for transmitting checking signals, said circuit means being connected to each of said receiver circuits of each of said communications means.

b. circuit means for receiving signals transmitted in response to the checking signals, said circuit being connected to each of said transmission circuits of each of said communications means, c. logic circuit means coupled to said receiver circuits and transmitter circuits of each said communication means for coupling said communications means to a corresponding one of said lines, each said logic circuit means being coupled to be controlled by said processing unit so as all said communications means may be disconnected in succession from said line for reception and transmission of said checking signals and said response signals.

4. The arrangement of claim 2 wherein said circuit means for receiving said response signals includes means for recording and analyzing the said response signals.

5. The arrangement of claim 2 wherein said circuit means for transmitting checking signals includes members which can be programmed from said processing unit on the basis of parameters characteristic of the communications transmitted by said communications means.

6. The arrangement of claim 4 wherein said programmable members are registers whose contents are coded to define the types of communications to be transmitted as either synchronous or asynchronous and the speed of said communications.

* * * * *

UNITED STATES PATENT OFFICE
CERTIFICATE OF CORRECTION

PATENT NO. : 3,943,348

DATED : March 9, 1976

INVENTOR(S) : Jean Akriche and Andre Molitor

It is certified that error appears in the above-identified patent and that said Letters Patent are hereby corrected as shown below:

Please correct the name of the Assignee to --Compagnie Honeywell Bull (Societe Anonyme), Paris, France in lieu of "Honeywell Information Systems Inc., Waltham, Massachusetts".

Signed and Sealed this

First Day of March 1977

[SEAL]

Attest:

RUTH C. MASON
Attesting Officer

C. MARSHALL DANN
Commissioner of Patents and Trademarks